United States Patent
McGary et al.

(10) Patent No.: US 8,208,889 B2
(45) Date of Patent: Jun. 26, 2012

(54) SYSTEM AND METHOD FOR PROVIDING EMERGENCY NOTIFICATION SERVICES VIA ENHANCED DIRECTORY ASSISTANCE

(75) Inventors: Faith McGary, Bethlehem, PA (US); Paresh Patel, South Grafton, MA (US)

(73) Assignee: Grape Technology Group, Inc., Bethlehem, PA (US)

( * ) Notice: Subject to any disclaimer, the term of this patent is extended or adjusted under 35 U.S.C. 154(b) by 610 days.

(21) Appl. No.: 11/505,245

(22) Filed: Aug. 16, 2006

(65) Prior Publication Data
US 2007/0087726 A1 Apr. 19, 2007

Related U.S. Application Data

(60) Provisional application No. 60/709,472, filed on Aug. 17, 2005.

(51) Int. Cl.
*H04M 11/04* (2006.01)
(52) U.S. Cl. .................. 455/404.1; 455/404.2; 340/540
(58) Field of Classification Search .................. 455/404, 455/456, 417, 410, 461, 415, 411, 404.1; 379/219, 45, 37, 196; 340/7; 342/457
See application file for complete search history.

(56) References Cited

U.S. PATENT DOCUMENTS

| 6,240,284 B1 | 5/2001 | Bugnon et al. ................ 455/404 |
| 6,868,074 B1 | 3/2005 | Hanson ......................... 370/328 |
| 7,676,829 B1 * | 3/2010 | Gui et al. ........................... 726/5 |
| 2002/0151305 A1 * | 10/2002 | Ward et al. ..................... 455/436 |
| 2002/0169584 A1 * | 11/2002 | Fu et al. ......................... 702/188 |
| 2004/0198386 A1 * | 10/2004 | Dupray ..................... 455/456.1 |
| 2004/0203768 A1 * | 10/2004 | Ylitalo et al. .............. 455/435.1 |
| 2004/0227629 A1 * | 11/2004 | Adamczyk et al. ...... 340/539.18 |
| 2005/0143048 A1 * | 6/2005 | Binning ..................... 455/404.2 |

OTHER PUBLICATIONS

Notification concerning transmittal of international preliminary report on Patentability dated Feb. 20, 2008.

* cited by examiner

*Primary Examiner* — Nick Corsaro
*Assistant Examiner* — Mahendra Patel
(74) *Attorney, Agent, or Firm* — Sofer & Haroun, LLP

(57) ABSTRACT

An enhanced directory assistance system includes a database for storing at least one subscriber emergency profile. The subscriber emergency profile has one or more instructions to be carried out in the case of an emergency and also has an identifier for identifying a mobile device of a corresponding subscriber. An operator terminal receives an incoming communication from one or more callers from the mobile device of the subscriber, such that when the communication is received, the operator terminal recalls the subscriber emergency profile and carries out the one or more instructions.

13 Claims, 9 Drawing Sheets

| Subscriber Name Field 102 | Subscriber ID field 104 |
|---|---|
| JIM JONES | (xxx) xxx-xxxx |
| Emergency Instructions Field 106<br><br>1) Call – Relative A at xxx-xxxx<br>2) Send Facsimile to Primary Care Physician (Dr. Smith) xxx-xxx<br>3) Send e-mail to Co-worker A at xxxxxx@xxxxxx.com (subject EMERGENCY FROM SUBSCRIBER) | |
| Medical history Filed 120<br>Blood type A-         Allergies – Penicillin        Medications - None<br>Prior medical conditions - XXXXXXXX | |

ICE emergency subscriber profile 100.

FIGURE 3

| Subscriber Name field 202<br>JIM JONES | Subscriber ID field 204<br>(xxx) xxx-xxxx |
|---|---|
| Emergency Instructions Field 206a (auto accident)<br>1) Call – Relative A at xxx-xxxx<br>2) Send Facsimile to Primary Care Physician (Dr. Smith) xxx-xxx<br>3) Send e-mail to Co-worker A at xxxxxx@xxxxx.com<br>4) call – auto insurance – agent X at xxx-xxxx | |
| Emergency Instructions Field 206b (medical)<br>1) Call – Relative A at xxx-xxxx<br>2) Send Facsimile to Primary Care Physician (Dr. Smith) xxx-xxx<br>3) Send e-mail to Co-worker A at xxxxxx@xxxx.com<br>4) Send e-mail to Heart Specialist A at xxxxx@xxxx.com<br>5) call – health insurance ID #123456789 – at xxx-xxxx | |
| Emergency Instructions Field 206c (home emergency)<br>1) Call – Relative A at xxx-xxxx<br>2) call – homeowner insurance – agent X at xxx-xxxx | |
| Emergency Instructions Field 206d (default)<br>1) Call – Relative A at xxx-xxxx<br>2) Send e-mail to Co-worker A at xxxxxx@xxxxx.com | |

<u>FIGURE 4</u>

| Subscriber Name Field 402 | Subscriber ID field 404 |
|---|---|
| JIM JONES | (xxx) xxx-xxxx |
| Emergency Event Field 406<br>1) Mobile Device ID (xxx) xxx-xxxx not to exceed 5 miles from Lat X – Lon -Y ||
| Emergency Instructions Field 408<br><br>1) Call – cellphone 555 555-5555<br><br>"Relative A has moved outside of the designated area." ||

ICE emergency subscriber profile 400

FIGURE 7

| Subscriber Name Field 502 | Subscriber ID field 504 |
|---|---|
| JIM JONES | (xxx) xxx-xxxx |
| Emergency Event Field 506<br>1) Monitor CO sensor from Mobile Device ID (xxx) xxx-xxxx. If alarm follow procedure in instruction field. ||
| Emergency Instructions Field 408<br>1) Call – 9-1-1 - "CO level alert at 123 Old House Lane, ST, ST 10000"<br>2) Call "Relative A - "A 9-1-1 call has been placed for Jim Jones based on high CO levels." ||

ICE emergency subscriber profile 500

FIGURE 8

SYSTEM AND METHOD FOR PROVIDING EMERGENCY NOTIFICATION SERVICES VIA ENHANCED DIRECTORY ASSISTANCE

RELATED APPLICATION

This application is related to and claims the benefit of priority from U.S. Provisional Patent Application No. 60/709,472, filed on Aug. 17, 2005, the entirety of which is incorporated herein by reference.

FIELD OF THE INVENTION

The present invention is related to directory assistance. More particularly, the present invention is related to providing enhanced emergency services using directory assistance.

BACKGROUND OF THE INVENTION

For its owner, the cell phone or other such mobile device is an indispensable lifeline at times of crisis, reuniting loved ones separated by unforeseen events at the touch of a button. But for members of the emergency services who make life-and-death decisions, the mobile phone address book poses a conundrum: Which of the numbers stored in their electronic address book should they call to reach a casualty's next of kin?

According to members of the emergency services, paramedics, police and firefighters often waste valuable time trying to figure out which name in a mobile phone to call when disaster strikes. They must look through wallets, or scroll through mobile address books for clues. Many people identify their spouse by name in their mobile device, making them indistinguishable from other entries. Sometimes, dialing the number for 'Mom' or 'Dad' might not be appropriate, particularly if they are elderly, or suffer from ill health.

Mobile phone users are being urged by various emergency service organizations to put the acronym ICE ("in case of emergency") as an entry in their address book. This entry then lists a name and contact telephone number that they would like an attending emergency service worker to contact as in the event of an emergency such as a car accident. A typical entry might read "ICE—Dad (555) 555-5555" or "ICE—Alison (666) 666-6666." These entries would give paramedics a way of getting hold of the appropriate person within a few seconds.

However, even though emergency service providers may wish to contact a relative or friend in the case of an emergency, their primary goal is not arranging for communications with the victim, but rather, to take care of all the minimum basic disaster relief, such as getting the patient to the hospital, etc. . . . The one call to the ICE listing in the address book is only to let at least one person know of the event, and possibly for getting instructions for medical care of an unconscious patient.

OBJECTS AND SUMMARY OF THE INVENTION

The present invention looks to provide an additional level of communication in times of emergency beyond a simple call to the ICE listing. In the present invention, a subscriber to the enhanced directory assistance system of the present invention is able to maintain, among other features, an address book in their cellular device that, in addition to the standard entries, also includes an entry identified as an ICE contact. However, unlike prior art systems, when the ICE contact or 9-1-1 is dialed by a user, the directory assistance system is contacted and one or more pre-defined functions, set by the subscriber, are carried out by the directory assistance system. Furthermore, a subscriber to the service may provide additional instructions on both the manner and content contained in the messages to be sent upon the ICE listing being contacted.

For example, in a first embodiment of the present invention, when the number of ICE is dialed, the ICE enabled directory assistance system is contacted and a set of pre-defined emergency functions are carried out either by an automated platform or by a live operator. In such situations it is contemplated that subscribers will set the ICE listing to a specified contact number which connects the caller directly to the system which immediately recognizes the call as an emergency. It is further contemplated that a hot/panic button may be added or activated on the subscriber's mobile device for use in directly dialing an operator assisted ICE number instead of first searching through the mobile device address book.

In another embodiment of the present invention, a subscriber may set up a predefined set of functions to be carried out by the directory assistance platform in the case of a caller dialing 9-1-1 on the subscribers' cellular telephone. Here, when the user dials 9-1-1, in addition to being connected immediately to the local emergency services, the directory assistance system is also contacted to carry out a predefined set of actions, such as communications to third parties. The call to the directory assistance system does not interfere with the 9-1-1, call but acts as a second or simultaneous communication from the mobile device.

In another embodiment of the present invention, a subscriber may set up a predefined set of functions to be carried out by the directory assistance platform. Such an ICE number is simply a typical ICE listing such as a relative, friend or co-worker. Here, when the user dials the number corresponding to the ICE listing, in addition to being connected immediately to the ICE listing, the directory assistance system is also contacted to carry out a predefined set of actions, such as communications with third parties. The call to the directory assistance system does not interfere with the ICE call but acts a second or simultaneous communication from the mobile device.

In yet another example of the present invention, the system may employ a location device, either in the subscriber's mobile phone or alternatively in another independent device, such that when a condition occurs, a predefined emergency procedure is carried out by the directory assistance platform. An exemplary condition may include but is not limited to moving beyond a certain distance from a particular pre-defined location.

In accordance with another aspect of the invention, the system may also enable a subscriber mobile device to activate a predefined emergency procedure based on a sensor event, such as heat, smoke, or accelerometer sensor. Any deviation from a predefined range of signals provided by the sensors triggers the dialing of a number for ICE in accordance with the invention.

The predefined emergency functions outlined above generally include sending predefined messages to contacts designated by the user in order to convey messages. Such messages may be automated to deliver the information in various formats including formats that have been converted for example, text to speech, speech to text, email, fax, instant messaging, or SMS.

Thus the mobile device or other such emergency sensors included therein or coupled thereto, and then through automation or a manual process, delivers the wireless owners/subscriber's pre-defined emergency instructions to the appropriate parties through multimodal means as outlined in detail below.

To this end the present invention provides for an enhanced directory assistance system includes a database for storing at least one subscriber emergency profile. The subscriber emergency profile has one or more instructions to be carried out in the case of an emergency and also has an identifier for identifying a mobile device of a corresponding subscriber. An operator terminal receives an incoming communication from one or more callers from the mobile device of the subscriber, such that when the communication is received, the operator terminal recalls the subscriber emergency profile and carries out the one or more instructions.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof may best be understood by reference to the following detailed description when read with the accompanying drawings in which:

FIG. 3 is a diagram of a subscriber account profile with ICE instructions as stored in the subscriber account database from FIG. 3, in accordance with one embodiment of the present invention;

FIG. 4 is a diagram of an alternative subscriber account profile with ICE instructions as stored in the subscriber account database from FIG. 3, in accordance with one embodiment of the present invention;

FIG. 7 is a diagram of a subscriber account profile with sensor instructions as stored in the subscriber account database from FIG. 1, in accordance with one embodiment of the present invention;

FIG. 8 is a diagram of a subscriber account profile with location instructions as stored in the subscriber account database from FIG. 1, in accordance with one embodiment of the present invention;

DETAILED DESCRIPTION

Figure 1:
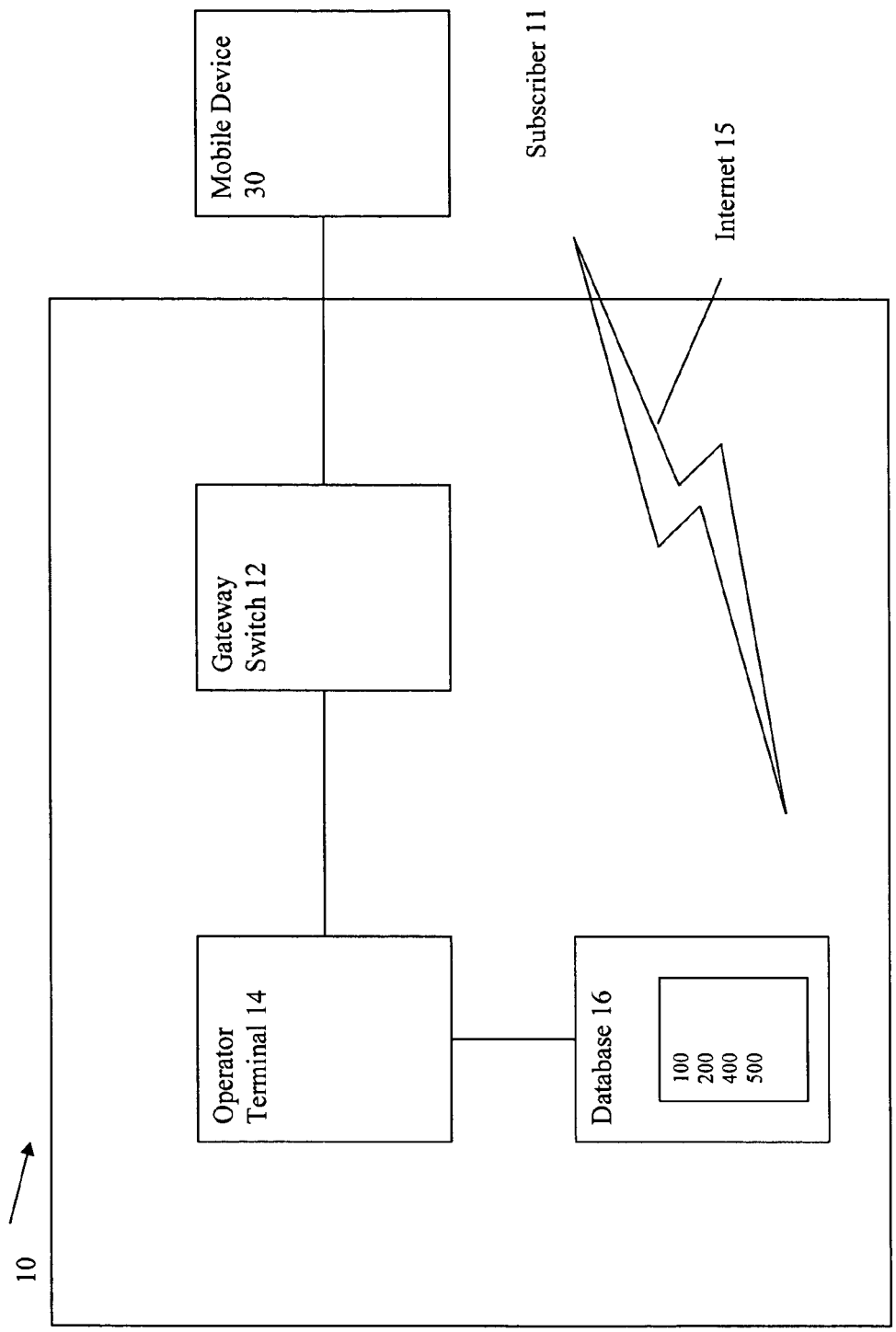
FIG. 1 is a block diagram of an ICE enabled directory assistance system, in accordance with one embodiment of the present invention.

In one embodiment of the present invention, as illustrated in FIG. 1, an ICE enabled directory assistance system 10 is shown. System 10 includes a Gateway/switch module 12 configured to receiving incoming communications from a mobile device 30 of a subscriber 11. It is understood that system 10 may be a stand alone system or instead may be a subset of a larger traditional directory assistance platform.

It is understood that gateway/switch module 12, and system 10 in general, is capable of handling all types of incoming telephony and messaging communications including, but not limited to PSTN (Public Switched Telephone Network), VoIP (Voice over IP), PLMN (Public Land Mobile Network), SMS, IM HTML, e-mail. For the purposes of illustration incoming messages to system 10 are described as originating from a mobile device such as a cellular telephone or other such wireless PDAs (Personal Digital Assistant).

Gateway/switch module 12 of system is coupled to an operator platform 14 configured to handle incoming calls to system 10. Operator platform 14 in the context of the present invention is understood to be any platform capable of handling incoming calls and performing the below described emergency support functions. For example, operator platform 14 might be a live customer service operator bank or alternatively it may be an automated response platform or some combination of the two. For the purposes of illustration, operator terminal 14 is discussed as being staffed by a live operator.

Operator platform 14 is coupled to a subscriber emergency instruction database 16. Emergency database 16 is configured to store a number of subscriber profiles 100, discussed in more detail below. When a caller contacts system 10 and the call is routed to operator platform 14 as an emergency call, the profile 100 for that subscriber 11 is recalled and operator platform 14 completes the desired instructions. A more detailed description of the call flow to system 10 is also described in more detail below.

Figure 2:
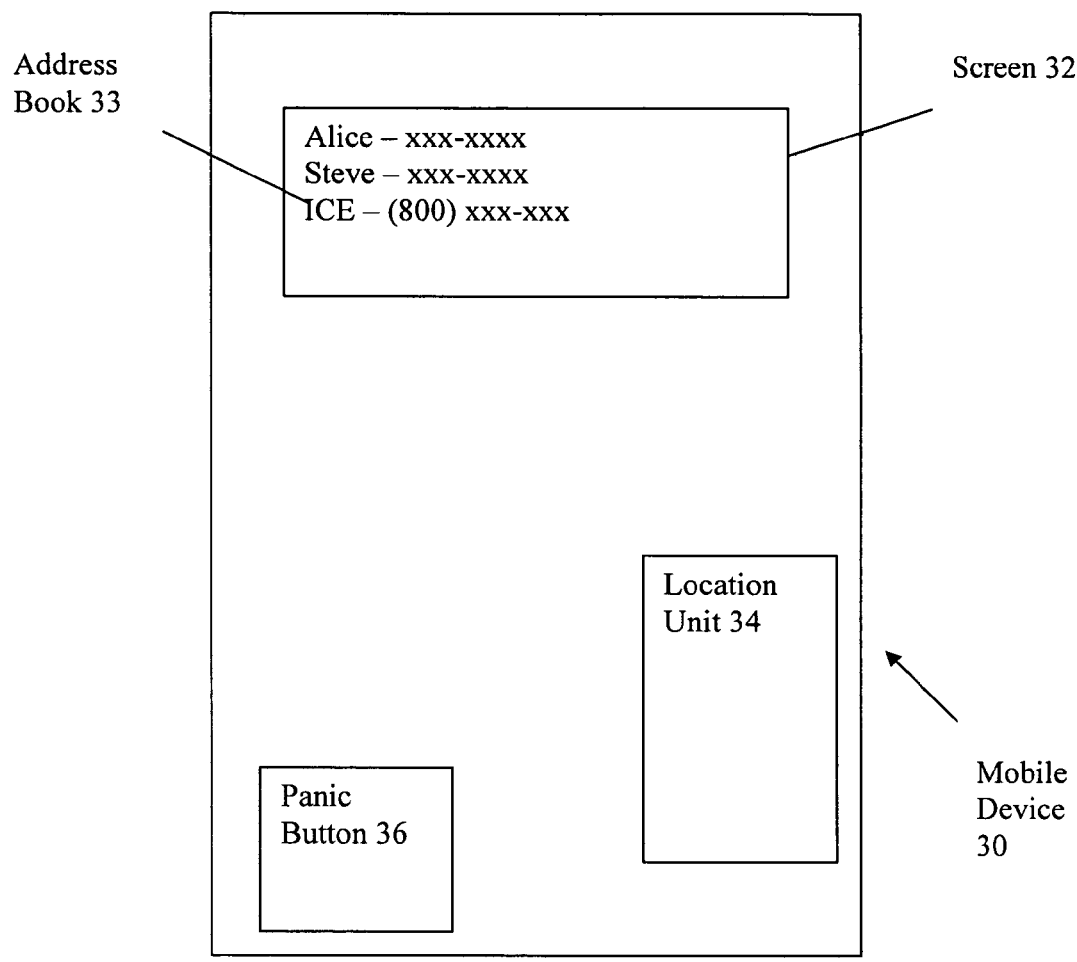
FIG. 2 is an illustration of an exemplary subscriber mobile device, in accordance with one embodiment of the present invention.

In one embodiment of the present invention, as illustrated in FIG. 2, a subscriber mobile device 30 is shown having a screen 32 for displaying an address book 33, a location unit 34, such as a GPS unit, and a panic/help button 36, although the invention is not limited to such an embodiment. For example, in accordance with another embodiment, mobile device 30 may include only address book 33. Screen 32 and address book 33 are contemplated as the standard screen and address book on any typical mobile device 30 such as a cellular telephone or cellular capable PDA.

Location unit 34 is an optional embedded unit for sending the location of mobile device 30 to system 10. Such location units 34 are typically GPS chips embedded within the mobile device, however any form of satellite or land based remote location systems can be supported. It is contemplated that the present invention, instead of using a location from mobile device 30, can instead use location information derived from other sources such as triangulation by the mobile carrier. However, for the purposes of illustration location information discussed in the present invention is based on information from internal location unit 34.

Panic/help button 36 is an optional button or key on mobile device 30 that is assigned the sole function of an emergency request. It is contemplated that rather than the user identifying an ICE number in address book 33, they can simply assign the number to panic/help key 36.

Turning now to the subscriber profile 100, in one embodiment of the present invention as illustrated in FIG. 3, subscriber 11 is able to designate a list of operations to be carried out in the case of an emergency call placed to the ICE number or 9-1-1 from their mobile device 30. It is understood that 9-1-1 is an exemplary emergency number, however, the invention is equally applicable to any emergency telephone contact system used worldwide.

Profile 100 includes a Subscriber name field 102, a subscriber ID number field 104 and an emergency instructions field 106. Subscriber name field 102 simply includes the name of subscriber 11 and subscriber ID field 104 includes an identification number used by system 10 to retrieve the appropriate profile 100 in the case of an emergency call to system 10.

For example, subscriber ID field 104 is typically filled using the telephone number (ANI—Automatic Number Identification MIN—Mobile Identification Number) of the mobile device, such that when a call is placed to system 10 it can recognize the incoming number and pull the appropriate profile 100 from database 16 and send it to operator terminal 14 for carrying out the pre-defined instructions. It is understood that ID field 104 may include additional forms of ID for identifying the appropriate profile 100 including e-mail, IP address or other forms of device/service identifying codes that are associated with mobile device 30.

Emergency instructions field 106 includes the set of instructions to be carried out by operator terminal 14 when an emergency call is placed to system 10. The instructions are provided to system 10 by subscriber 11 by any number of means including but not limited to e-mail, telephone, HTTP (web access), etc. . . . , and can be updated regularly by subscriber 11.

Typically instructions field 106 includes one or more actions to be taken by operator terminal 14 once receiving the emergency call. Such actions may be to make a telephone call, send a facsimile, send an e-mail, etc. . . . The number of possible instructions are too numerous to give examples, but any basic communication based instructions are within the contemplation of the present invention.

For example, in FIG. 3, profile 100 includes three instructions to be carried out by operator terminal 14 in the case of an emergency call to system 10 as pre-set by subscriber 11. In this example, upon receiving an emergency call from mobile device 30, system 10 pulls profile 100 for subscriber 11 from database 16 and first calls "Relative A" notifying them of the emergency. Next, a facsimile is sent to the primary care physician notifying them of the emergency. Finally, the operator platform sends an e-mail to "Co-worker A" also notifying them of the situation. If operator terminal 14 receives any pertinent medical information from the caller, such information can be forwarded, as appropriate to the various parties to be notified of the emergency as instructed by field 106, particularly to any medical persons such as physicians.

In another embodiment of the present invention profile 100 may include a medical information field 120 that includes blood type, prior medical conditions, allergies, medications, etc. . . . Although this field is shown only in profile 100 it is understood that such a field may be optionally included any one of the profiles discussed below.

In one embodiment of the present invention, in addition to simply providing instructions to make a series of communications to various parties, subscriber 11 may further direct the actual text of the message being sent. For example, subscriber 11 may direct the message to "Relative A" to read: "Your son has just dialed 9-1-1 from his cellular telephone, please contact him immediately. We can also provide you his location." Likewise, the message to primary care physician may read: "Dr. Smith, your patient Mr. Jones has suffered a medical incident, please attempt to contact emergency personnel via his cellular telephone 555-555-5556."

Furthermore, in order to stress that the situation is an emergency, the directory assistance system, when carrying out the predefined tasks, such as contacting loved ones or personal physicians, may preface the call or electronic message with an "EMERGENCY" tag, similar to a subject heading on an e-mail. This will allow the contacted person or persons to know that the incoming message or call is of an urgent nature. In this arrangement a text display to the user on their cellular phone or other digital display land line phone will be a highly visible indication of an emergency. This message may even be coupled with a notification for a special ring tone that identifies an emergency, should the called party's device accept such instructions.

In one embodiment of the present invention, the heading or text message of an emergency may be supplied by the directory assistance service, either typed in by a customer service representative, or generated by an automated DA platform. Alternatively, the subject header for the emergency may be generated by the land-line carrier or MSO (Mobile Switching Operator).

In fact, such subject message headers, either produced by service provider or the DA platform, may not have to relate to an emergency at all, but instead may be used for other purposes as a global "subject" heading. This would depend on the detail provided by the caller, as not all emergencies are equal in gravity. Such global header topics may include but are not limited to: "WORK" for incoming calls from work or work related sources, "NON-URGENT" for calls that do not need to be addressed immediately, "SCHOOL" for calls originating from a child's school, and other such subject lines. As an additional features, the message headers may even be generated directly by the caller, if the DA platform, service provider, caller and called party's equipment allows for such messaging.

The following are possible scenarios that may employ such a service may include but are not limited to:
Scenarios.
 Missing or injured child, pet, adult or senior
 Accidents while traveling Nationally or Internationally
 Unconscious person unable to communicate
 Natural Disasters (Hurricanes, Tornados, Floods, Tsunamis, Fires)
 Terrorist Acts Nationally or Internationally
 Deceased person used to locate a next of kin or point of contact
Locate or Alert an Owner of a Lost Pet Through with Wireless Location (GPS) Sensor It is understood that the present invention contemplates a call to system 10 in the case of an emergency. Thus, many times the call to system 10 will be placed by a caller (other than the subscriber) rather than the subscriber 11, usually because subscriber 11 is incapacitated. As such, operator terminal 14 may not have a great amount of detail other than the fact that an emergency has occurred. On the other hand if the caller (or subscriber 11 if available to make the ICE call) gives sufficient information, operator terminal 14 may include an appropriate amount of additional information regarding the nature of the emergency (car accident, medical, fire etc. . . . ) in their pre-arranged communications as set up by subscriber 11. It is further contemplated that location unit 34, such as GPS unit 34 may, regardless of the amount of information provided by the caller, at least provide operator terminal 14 with a substantially accurate location of mobile device 30 at the time of the call.

In fact, in another embodiment of the present invention as illustrated in FIG. 4, profile 200 may be setup by subscriber 11, having alternate sets of instructions for different emergency situations. Here, profile 200 includes the same name field 202 and ID field 204 as profile 100. However, profile 200 maintains multiple instruction fields 206a-206x, each used for a different type of emergency.

In the present example, subscriber 4 has listed 4 different instructions fields 206a-206d. Instruction field 206a is for use when there is a car accident. Instruction field 206b is for use when subscriber 11 has a medical emergency (possibly for a known condition). Instruction field 206c is for use when there is home emergency such as fire or water/weather damage and instruction field 206d is for use as a generic instruction, assuming the caller (or subscriber 11) does not provide the details of the emergency.

Field 206a provides instructions to contact "Relative A", then to send an e-mail to "Co-worker A," then to send a facsimile to the primary care physician and to finally, contact the auto-insurance company. Field 206b provides instructions to contact "Relative A", then send an e-mail to "Co-worker A," then send a facsimile to the primary care physician, then send an e-mail to "Medical Specialist A" and finally, contact the health insurance company. Field 206c provides instructions to contact "Relative A" and to contact the homeowner insurance company. Field 206d provides instructions to contact "Relative A" and send an e-mail to "Co-worker A." It is understood that any similar contact instructions are also within the contemplation of the present invention.

Thus, according the present invention, during an emergency situation, system 10 is able to contact pre-identified individuals or groups as identified by subscriber 11 and notifying them about the emergency situation. Pre-identified parties to be contacted as stored in emergency contact instructions field 106 may include but are not limited to include: spouse, children, parents, guardian, care giver, home health monitoring service, doctor or other licensed practitioners such as a mid wife or other individuals or groups.

Figure 5:
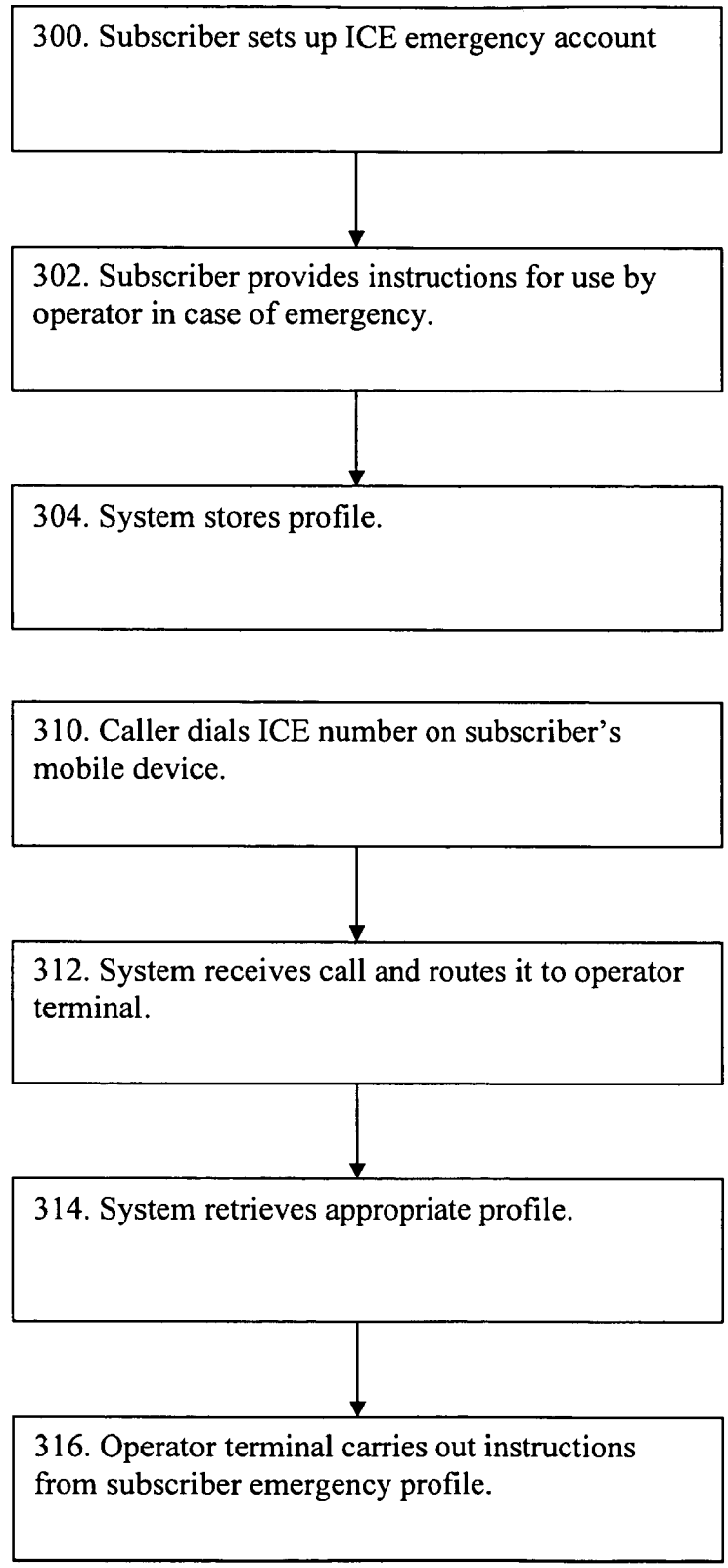
FIG. 5 is a flow chart of the operation of a call placed to ICE enabled directory assistance system of FIG. 1, in accordance with one embodiment of the present invention.

Turning now to the operation of system 10, as illustrated in flow chart FIG. 5, at a first step 300, subscriber 11 designates an ICE number in their address book 33 of their mobile device 30. Such a designation may in occur in any one of several fashions. As noted above, subscriber 11 may set the ICE to contact system 10 directly in which case the number is set to a particular emergency contact number, such as 1-800-xxx-xxxx, for system 10. This number not only contacts system 10 but also is recognized by gateway/switch 12 as an emergency call so that it is appropriately routed to emergency operator platform 14 as opposed to a generic operator platform in the case where system 10 also provides other non-emergency services such as standard directory assistance. It is contemplated that instead of an ICE listing in address book 33, such a contact instruction may be programmed into help/panic button 36.

Alternatively, if subscriber 11 sets the ICE to be a standard telephone number of a friend or co-worker, they can set their mobile device 30 to simultaneously or subsequently contact system 10. Such a feature may be supported by mobile device 30, the mobile carrier, or may be provided as a software plug-in provided by system 10. Similarly, subscriber 11 may set their mobile device 30 to simultaneously or subsequently contact system 10 after a 9-1-1 call is placed.

Regardless of how the ICE contact is set in step 300, in step 302, subscriber 11 sets the various instructions to be followed in the case of an emergency call as outlined above. This can be done directly over the phone with operator terminal 14 or via a direct on-line internet connection 15 with system 10 that allows subscriber 11 to access/modify profile 100. At step 304, system 10 saves profile 100 to database 16 for future retrieval.

Assuming the event of an emergency, at step 310 a caller (or subscriber 11) contacts system 10 according to the methods set by subscriber 11 at step 300. Next, at step 312, system 10 receives the call at switch/gateway 12, recognizes that the call is an emergency call and routes the call to emergency operator terminal 20.

At step 314, operator terminal uses the mobile number of mobile device 30 and pulls the corresponding profile 100 (or 200) from database 16. Finally, at step 316, operator terminal carries out the instructions in emergency instructions field 106 as set by subscriber 11.

Figure 6:
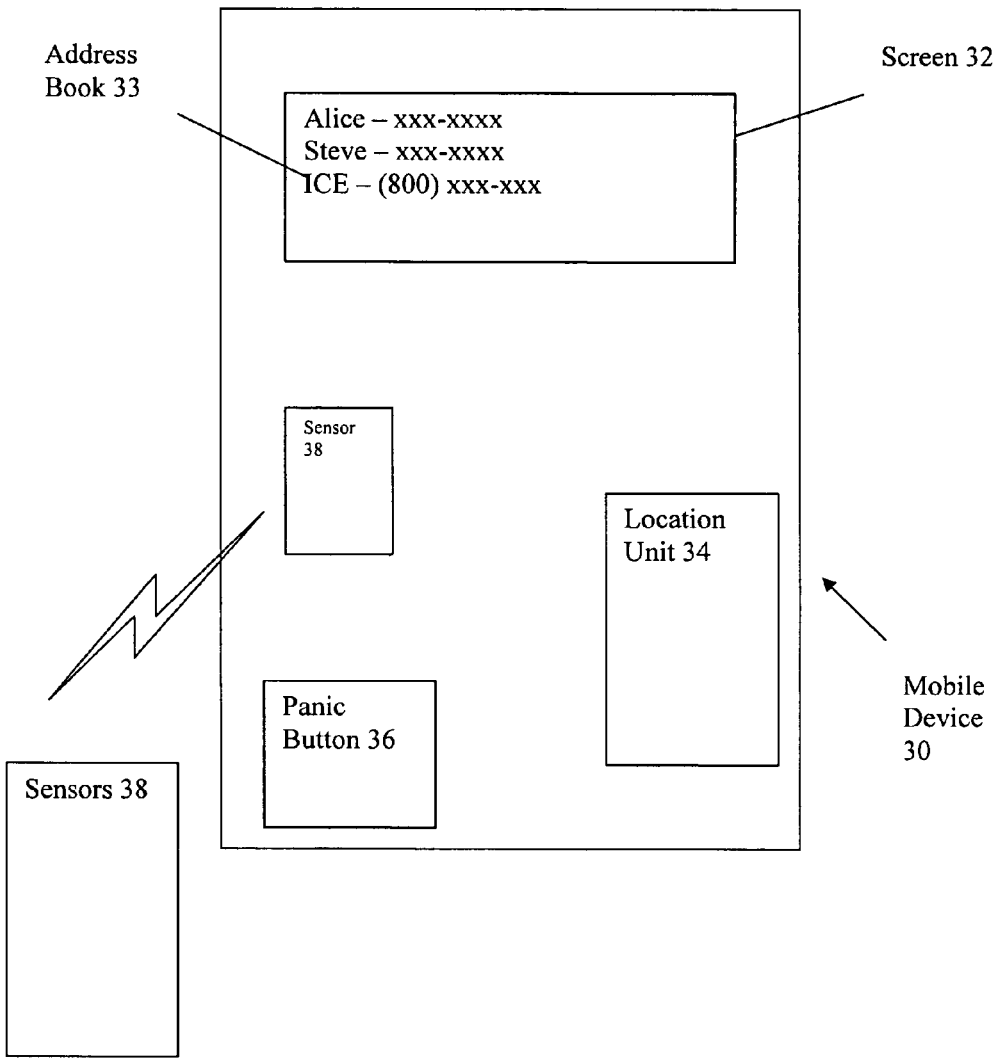
FIG. 6 is an illustration of an exemplary subscriber mobile device with sensors, in accordance with one embodiment of the present invention.

In another embodiment of the present invention as illustrated in FIG. 6, system 10 may be further enhanced to carry out emergency contact instructions in the event of a sensor event detected in mobile device 30. As shown in FIG. 6, in addition to the components illustrated in FIG. 2, mobile device 30 further maintains a sensor module 38 such as a smoke detector, CO sensor, motion sensor etc. . . . Such sensors 38 may be included in the mobile device 30 as purchased or may be coupled to the mobile device as add-on components.

It is contemplated that similar to the instructions provided by subscriber 11 in profile 100 or 200, subscriber 11, may also use embedded sensor module 38 or even location unit 34 to trigger an emergency contact with system 10 to carry out a predefined set of instructions.

For example, subscriber 11 may set up an emergency procedure to be carried out by the directory assistance platform 10 in the event that the mobile device 30 (GPS enabled tag, card, or other similar device) reaches a location beyond a certain pre-set radius from a central location. For example, if subscriber 11 has a child they may give them a cellular telephone mobile device 30 (or mobile device that is GPS enabled) and instruct them not to leave 3 blocks from their house. If system 10 (or the device 30 if internally programmed as such) detects via GPS that mobile device 30 has left that radius, a call to system 10 is automatically sent so that emergency operator terminal 14 can initiate the pre-defined tasks which may include placing a notification call to subscriber's 11 home phone or another cellular phone owned by subscriber 11.

Similarly a pet collar (mobile device 30 with at least a location unit 34 and some communication ability) may be placed on a pet dog such that if it leaves a certain radius from home, then the predefined tasks set by subscriber 11 are automatically performed by directory assistance system 10 such as calling the subscriber and possibly sending a customized page or text message to be displayed directly on the dog collar to assist local k-9 services in returning the dog.

In a first exemplary embodiment of such location triggered emergency responses, as illustrated in FIG. 7, subscriber 11 contacts system 10 and sets up an emergency location profile 400 having a subscriber name field 402 and subscriber ID field 404, similar to profile 100. However, profile 400 maintains a location notation emergency event field 406 that defines an event that triggers an emergency reaction and an emergency instructions field 408 that are to be carried out once the event in field 406 is met. It is contemplated here that subscriber 11 requests that mobile device 30 be monitored by system 10 (or, if supported, instructs mobile device 30 to send periodic pings to system 10 for self monitoring purposes).

In the present example, event field 406 is set with a triggering event of 5 miles from location "X." Such a location boundary can be a latilongitude or may be based on a geocoded street address. Emergency instructions field 408 in the present example has been set by subscriber 11 to place a call to telephone number 555 555-5555, such as the number of another subscriber cellular phone apart from the monitored mobile device 30, and to give the pre-set message: "Relative A has moved outside of the designated area."

As with profiles 100 and 200, subscriber 11 can modify profile 400 either telephonically through operator terminal 14 or on-line via direct internet link 15.

In another similar arrangement of the present invention, mobile device 30 of the subscriber may employ sensors 38 for sensing certain conditions and initiate contact with the processing center to initiate a predefined set of tasks.

The conditions to be monitored can be substantially and possibly relevant conditions. For example, the sensors may monitor heart rate, temperature, air bag deployment, smoke or other air contaminants (CO), location, sudden acceleration, and other conditions. These sensors 38 may be utilized to determine potential emergency situations. As noted above, sensors 38 can be incorporated directly into mobile device 30 or communicate remotely with mobile device 30 via Bluetooth or other local remote signaling.

For example, an accelerometer sensor 38 can trigger mobile device 30 to signal subscriber 11, requesting verification to system 10 of the safety of subscriber 11. If the mobile device 30 is a wireless phone, profile 400 can be arranged such that if sensor 38 reaches a triggering point, system 10 will ring mobile device 30, and if subscriber 11 does not answer the ring, an operator at system 10 or wireless device 30 itself can be ordered to initiate automatic communications with system 10, emergency services (9-1-1), and pre-determined contacts from the address book on the wireless device.

As discussed above, when the system of the present invention initiates a contact as per the instructions of subscriber 11, the call or message to the the intended recipient may use a notice included in the message such as "EMERGENCY" or 'EMERGENCY—NOTIFICATION EVENT IDENTIFIED." This immediately allows the called party to identify that the call is important and is originating from the ICE instructions.

In a second exemplary embodiment, as illustrated in FIG. 8, subscriber 11 contacts system 10 and sets up an emergency sensor event profile 500 having a subscriber name field 502 and subscriber ID field 504, similar to profile 100. However, profile 500 maintains a sensor event field 506 that defines an event that triggers an emergency reaction and an emergency instructions field 508 that are to be carried out once the event in field 506 is met. It is contemplated here that subscriber 11 requests that mobile device 30 be monitored by system 10 (or, if supported, instructs mobile device 30 to send periodic pings to system 10 for self monitoring purposes).

In the present example, it is contemplated that mobile device 30 includes a CO alarm sensor 38, which maintains some predetermined threshold for CO levels. Event field 506 is set is set so that the triggering event is receiving an alarm signal from mobile device 30 generated by CO alarm sensor 38. Emergency instructions field 508 in the present example has been set by subscriber 11 to place a call 9-1-1 and notify them of the location and reason for the call (high CO levels) and then send a second call to "relative A"

Figure 9:
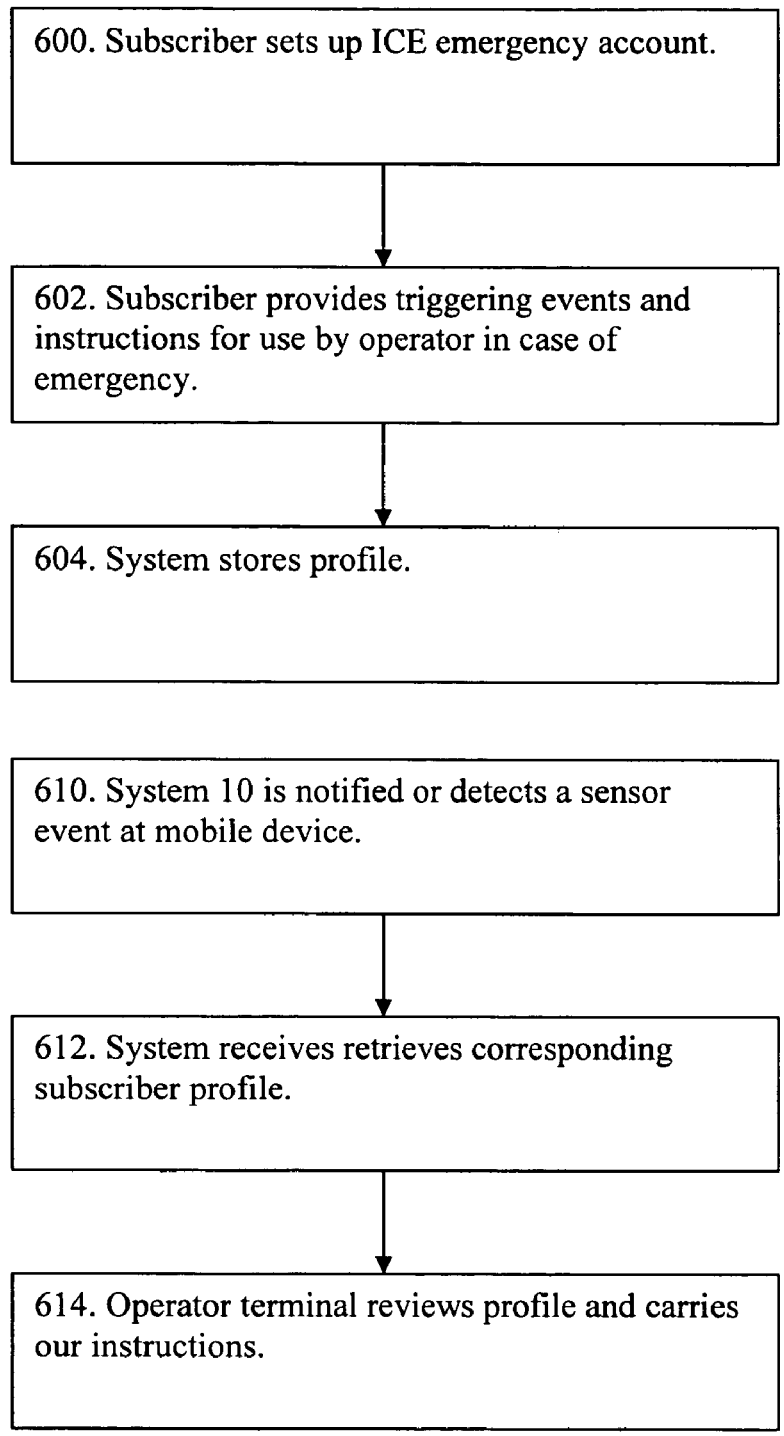
FIG. 9 is a flow chart of the operation of a sensor/location event notice to ICE enabled directory assistance system of FIG. 1, in accordance with one embodiment of the present invention.

The operation of such features as shown in flow chart FIG. 9 show an exemplary process of generating either profile 400 or 500 and subsequent activation of the emergency instructions in fields 408 or 508.

At a first step 600, subscriber 11 contacts system 11 and sets up a sensor or location profile 500 or 400, indicating the attached mobile device 30 and giving their name for fields 402, 404, 502 and 504 as discussed above. Next, at step 602 subscriber 11 first sets the triggering event, either location based or sensor 38 based, that will set of the conducting of the emergency instructions. It is contemplated at this step will also include whether mobile device 30 will periodically ping system 10 to monitor location or sensor 38, or if system 10 will "check" by sending a OK? request to mobile device 30 and wait for a reply.

At step 604, subscriber 11 sets the various instructions to be followed in the case sensor 38 or location unit 34 registers an event beyond the threshold event set in step 602. This can be done directly over the phone with operator terminal 14 or via a direct on-line internet connection 15 with system 10 that allows subscribe 11 to access/modify profiles 400 and 500. At step 604, system 10 saves profile 100 to database 16 for future retrieval.

Assuming the triggering event occurs, at step 610 the system registers the triggering event occurred and at step 612 it recalls the corresponding profile 400 or 500 from database 16. Finally, at step 614, operator terminal 14 carries out the instructions in emergency instructions field 408 or 508 as set by subscriber 11 in step 604.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An enhanced directory assistance system, said system comprising:
   a database for storing a subscriber sensor instructions profile, said subscriber sensor instructions profile having:
   an identifier for identifying a corresponding mobile device of a corresponding subscriber, wherein said mobile device includes a location unit for providing the location of said mobile device;
   a stored triggering event information relating to information to be supplied to said system when an event is detected by one or more sensors that communicates with said mobile device;
   a plurality of sets of instructions each one of said sets including a specific set of instructions to be carried out depending on a different type of emergency event in response to said system receiving said triggering event information; and
   an operator terminal for receiving an incoming communication from said mobile device of said subscriber, including information generated by one or more of said sensors communicating with said mobile device as well as location information of said mobile device of said user provided by said location unit within said mobile device;
   wherein when said communication is received along with the nature and location of the emergency from said mobile device of said user via said sensor and said location unit, said operator terminal recalls said subscriber sensor instructions profile and identifies a correct set of instructions among said plurality of instructions in subscriber sensor instructions profile relating to any one of the nature of the emergency, the location of the emergency or both, and applies said identified set of instructions.

2. The enhanced directory assistance system as claimed in claim 1, wherein said identifier for identifying a mobile device of a corresponding subscriber is the mobile device telephone number.

3. The enhanced directory assistance system as claimed in claim 1, wherein said sensor is either embedded within said mobile device or is remotely located from said mobile device.

4. The enhanced directory assistance system as claimed in claim 1, wherein said sensor is any one of the group selected from smoke detectors, CO sensors, motion sensors, air bag deployment sensors, heart rate monitors and accelerometers.

5. The enhanced directory assistance system as claimed in claim 1, wherein said sensor is configured to be actively monitored by said system or said sensor can be set to periodically send data to said system.

6. The enhanced directory assistance system as claimed in claim 1, wherein said instructions to be carried out in the case of a sensor alert emergency includes said operator terminal generating communications to one or more third parties.

7. The enhanced directory assistance system as claimed in claim 6, wherein said calls to one or more third parties includes pre-defined messages to said third parties as set by said subscriber.

8. The enhanced directory assistance system as claimed in claim 6, wherein said calls to one or more third parties includes a call to a local emergency services provider regarding the nature of the sensor event and the location of the event.

9. The enhanced directory assistance system as claimed in claim 1, wherein said subscriber can adjust said instructions to be carried out in the case of a sensor event stored in said database either by direct communication with said operator terminal or via the internet.

10. The enhanced direct assistance system as claimed in claim 1, wherein said operator terminal is either one of an automated platform or attended by a live customer service agent.

11. A method for providing enhanced emergency procedures for a user via an enhanced directory assistance system, said method comprising the steps of:
   generating a subscriber sensor instructions profile in response to user instructions, said subscriber sensor instructions profile having:
   an identifier for identifying a corresponding mobile device of a corresponding subscriber, wherein said mobile device includes a location unit for providing the location of said mobile device;
   a stored triggering event information relating to information to be supplied to said system when an event is detected by a sensor that communicates with said mobile device;
   a plurality sets of instructions each one of said sets including a specific set of instructions to carried out depending on a different type of emergency event in response to said system receiving said triggering event information; and
   receiving an incoming communication at an operator terminal from said mobile device of said subscriber, including the nature of the emergency from said one or more of said sensors as well as location information of said mobile device of said user provided by said location unit within said mobile device;
   wherein when said communication is received along with the nature and location of the emergency, said operator terminal recalls said subscriber sensor instructions profile and identifies a correct set of instructions among said plurality of instructions in said subscriber sensor instructions profile relating to any one of the nature of the emergency, the location of the emergency or both, and applies said identified set of instructions.

12. The method as claimed in claim 11, wherein said operator terminal carries out said one or more instructions either in an automated manner or via a live customer service representative.

13. The method as claimed in claim 11, wherein said instructions includes calling a local emergency services provider regarding the nature of the sensor event and the location of the event.

* * * * *